United States Patent [19]

Retter et al.

[11] Patent Number: 5,379,070
[45] Date of Patent: Jan. 3, 1995

[54] PARALLEL ENCODING/DECODING OF DCT COMPRESSION/DECOMPRESSION ALGORITHMS

[75] Inventors: Rafael Retter; Aharon Gill, both of Haifa, Israel; Isaac Shenberg, Palo Alto, Calif.

[73] Assignee: Zoran Corporation, Santa Clara, Calif.

[21] Appl. No.: 956,727

[22] Filed: Oct. 2, 1992

[51] Int. Cl.$^6$ .............................................. H04N 7/133
[52] U.S. Cl. ...................................... 348/403; 348/408
[58] Field of Search ................. 358/133, 136; 364/725; H04N 7/133; 348/403, 408

[56] References Cited

U.S. PATENT DOCUMENTS

| | | | |
|---|---|---|---|
| 4,293,920 | 10/1981 | Merola | 364/725 |
| 5,130,797 | 7/1992 | Murakami et al. | 358/133 |
| 5,170,259 | 12/1992 | Niihara | 358/133 |

Primary Examiner—Tommy P. Chin
Assistant Examiner—Richard Lee
Attorney, Agent, or Firm—Townsend and Townsend Khourie and Crew

[57] ABSTRACT

Encoding and decoding speed in using DCT and IDCT algorithms is enhanced by parallel operation of coding and decoding devices. A frame of image data can be vertically sliced with each slice operated on by a dedicated encoding device and with the encoded slice data concatenated to form the encoded frame of data. Decoding speed is increased by using a plurality of decoding devices in parallel with each decoder having a Huffman decoder and a coefficient dequantizer through which all coded data flows. Only assigned blocks of data are operated on by the IDCT unit in each decoder. Each decoder device can have a plurality of IDCT units for operating on assigned blocks of data.

12 Claims, 5 Drawing Sheets

PARALLEL ENCODING/DECODING OF DCT COMPRESSION/DECOMPRESSION ALGORITHMS

BACKGROUND OF THE INVENTION

This invention relates generally to discrete cosine transform (DCT) based compression and decompression of data, and more particularly the invention relates to enhanced speed of coding and decoding operations in implementing such algorithms.

Image compression is used in reducing large volumes of data in digitized images for convenient and economical storage and for transmission across communication networks having limited bandwidth. Image compression technology is important in digital still video cameras, color scanners, color printers, color fax machines, computers, and multimedia.

The joint photographic experts group (JPEG) has established a color image data compression standard and a draft after compression standard for use in a variety of still image applications. Compression employs DCT-based processes operating on discrete blocks of the image. The DCT coefficients are then quantized, for example based on measurements of the threshold for visibility. For coding, an 8×8 pixel array of DCT coefficient is reorganized into a one dimensional list using a zigzag sequence which tends to concentrate coefficients expressing the lowest spatial frequencies at lower indices with the DC component being number 0 in the zigzag. The quantized AC coefficients are then encoded using a Huffman coder. Finally, headers and markers are inserted in the compressed file along with bit and byte stuffings for JPEG data compatibility. FIG. 1 illustrates the JPEG baseline compression algorithm.

The compressed data can then be stored (as in an electronic still camera) or transmitted efficiently over a limited bandwidth communication network. Reconstruction of the image requires a reverse process in which the headers and markers are extracted, the Huffman code is decoded, coefficients are dequantized, and an inverse DCT (IDCT) operation is performed on the coefficients.

Zoran Corporation (assignee herein) has developed a chip set for image compression including a discrete cosine transform (DCT) processor designated ZR36020 and an image compression coder/decoder designated ZR36040, as shown in FIG. 2. The chip set employs an algorithm for high quality compression of continuous tone color or monochrome images. The DCT processor implements both forward and inverse discrete cosine transform computations on 8×8 pixel blocks, while the coder/decoder implements the quantization, dequantization, Huffman encoding and decoding of the image compression algorithm. The chip set reduces the large data size required to store and transmit digital images by removing statistical redundancies in the image data while maintaining the ability to reconstruct a high quality image. For example, in digital still video cameras, the chip set enables the use of 1M byte solid state memory card instead of a 4M byte hard disk to store 22 768×480 pixel images. The chip set also reduces the time required to transmit a 768×480 pixel image over a standard 9600 bits per second telephone line from 15 minutes to 40 seconds. The chip set has been optimized for use in digital still video cameras, color video printers, fixed bit rate image transmission devices, security systems, and cost sensitive image compression systems.

The quantization of the coefficients is done by using quantization tables. The compression ratio is controlled by scaling the quantization tables with a uniform scale factor. A large scale factor results in a high compression ratio and vice versa. The mechanism to determine the scale factor is by using the two passes: the first pass through the image is done with an initial scale factor (ISF). The quantization tables are scaled with the initial scale factor. Code volume needed for encoding the quantized DCT coefficients is accumulated during this pass using the Huffman tables (ACV data). This code volume is then used as the activity measure of the image.

Image compression frequently involves processing of large amounts of data in high data rates. The requirements from the processing system both when encoding the data and decoding the data are enormous and grow linearly with the number of pixels in the image. The requirements are even heavier in encoding when more than one pass through the data is required for gathering statistics. The encoding time grows linearly with the number of passes through the image.

One way to enhance the processing speed is to build more complex devices which have more hardware and process data faster. However, more complex devices are expensive, impractical for lower speed applications, and possibly impossible to implement at this time.

The present invention is directed to providing a device which can operate independently for standard rate systems and which includes minimum functions which support operation of a plurality of devices in parallel.

SUMMARY OF THE INVENTION

In accordance with the invention, encoding and decoding speed in implementing DCT based algorithms is enhanced by encoding and decoding function units which can operate independently or in parallel.

When the number of pixels in an image is too high to be compressed by a single device within a specified time, the image is split vertically into N equal slices. The number of slices depends on the number of pixels and the required processing power. Each slice is encoded by a separate device and the N compressed files are merged together to form a single JPEG. To guarantee proper operation, a restart marker is inserted at the end of every row of every vertical slice.

One of the factors which limits the number of devices which can be operated in parallel is the overhead due to the restart marker at the end of every MCU row of each vertical slice. Three features are added to the device to enable the parallel operation. These features allow the device to build the different partial compressed files according to the JPEG (DCT) standard, handle restarts properly, and synchronize vertical slice boundaries.

In decoding compressed data, a single device can include parallel IDCT function units to increase decoding speed. The compressed file has less data than the original files since most of the DCT coefficients after compression become zero and the total number of bits in the compressed file is small. Most of the decompression process (i.e. Huffman decoding, DC coefficient generation, and dequantization), except for the IDCT, is proportional to the number of non zero quantized coefficients. Accordingly, each device can actually decode all of the compressed file, except for the IDCT function, which is proportional to the number of pixels and not the number of non zero coefficients.

Since the IDCT function is inexpensive of terms of die size, a plurality of IDCT function units can be included in each decoder device.

The invention and objects and features thereof will be more readily apparent from the following detailed description and appended claims when taken with the drawing.

DETAILED DESCRIPTION OF ILLUSTRATIVE EMBODIMENTS

Figure 1:
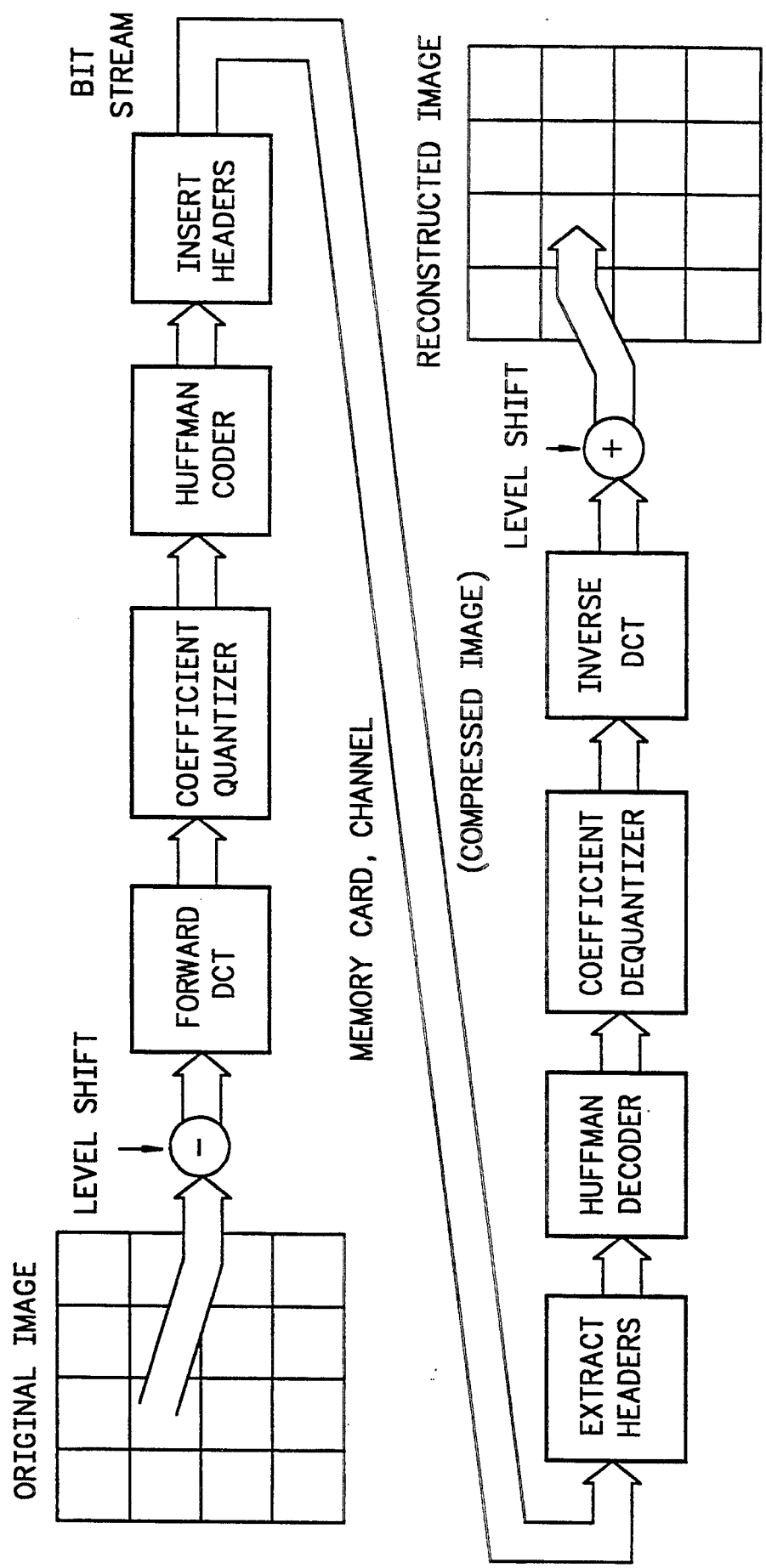
FIG. 1 is a functional block diagram illustrating a compression/decompression algorithm.
Figure 2:
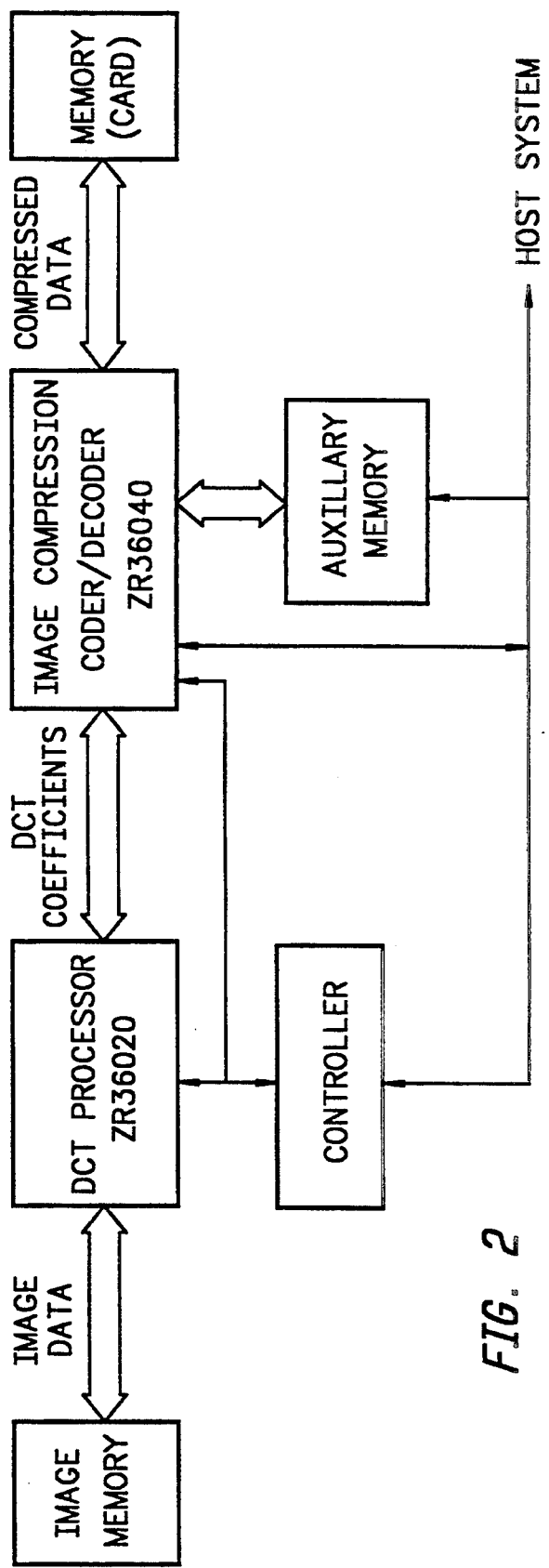
FIG. 2 is a functional block diagram of apparatus for implementing the algorithm of FIG. 1.

As described above, FIG. 1 is a functional block diagram of the DCT/IDCT compression algorithm, and FIG. 2 is functional block diagram of the Zoran image compression chip set including the ZR36020 DCT processor and the ZR36040 coder/decoder.

Figure 3:
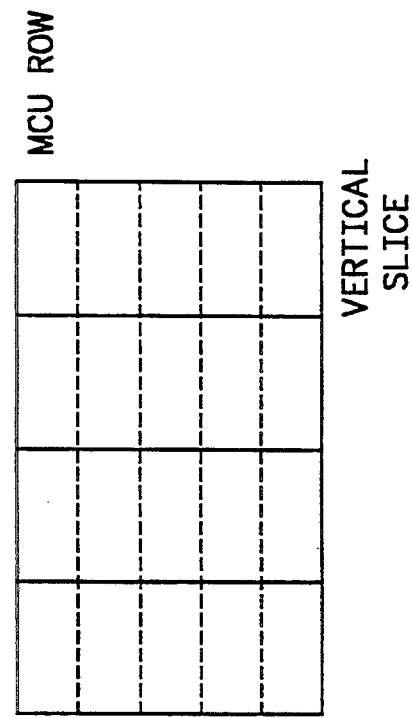
FIG. 3 is an illustration of a compressed signal memory divided into four vertical slices.

When the number of pixels in the image is too high to be compressed by a single device within a specified time, the image is split vertically into N equal slices, such as the four vertical slices shown in FIG. 3. The number of slices depends on the number of pixels and the required processing time.

Each slice is encoded by a separate device and the N compressed files are merged together to a single JPEG file. To guarantee proper operation, a Restart marker is inserted at the end of every minimum code unit (MCU) row of every vertical slice.

Two factors may limit the number of devices, which can be paralleled. The first one is the overhead due to the Restart marker at the end of every MCU row of each vertical slice and the second one is how fast the system can concatenate the partial compressed files into one JPEG file. For example, four parallel devices compressing an image with 1024 columns, to 1 bit/pixel generate code overhead of about 1.5%.

Three features are added to the device to enable the parallelism. These features allow the device to build the different partial compressed files according to the JPEG standard, to handle Restarts properly and to synchronize vertical slices boundaries.

Figure 4:
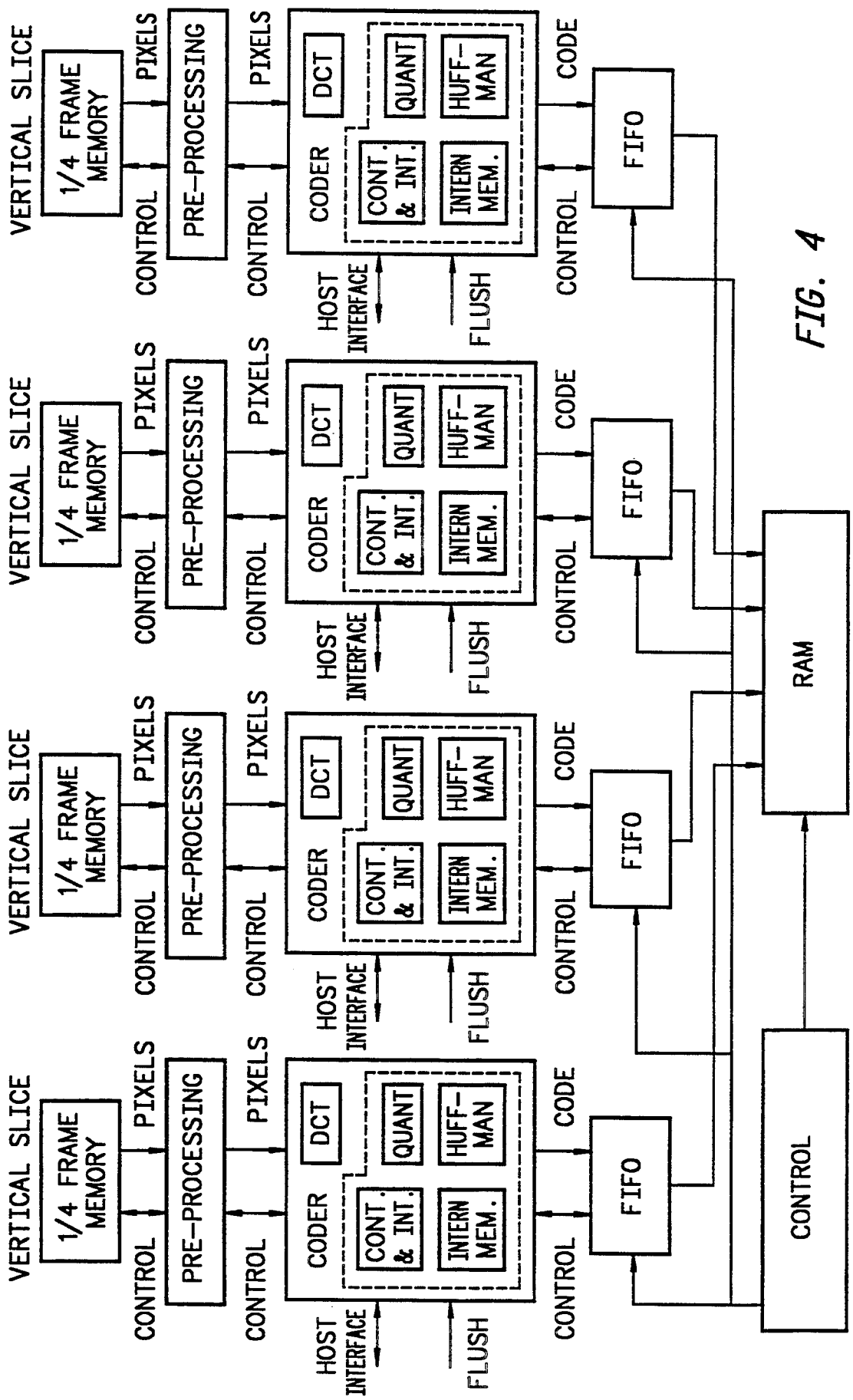
FIG. 4 illustrates signal compression using four devices operating in parallel in accordance with one embodiment of the invention.

The slice boundary must be on an MCU boundary. Each device will process one vertical slice and will generate many small compressed file segments (one for every MCU row). The compressed file segments are concatenated together, in the proper order to generate a single JPEG file out of them. The order is the first file segment of each vertical slice, starting with the most left one, then the second file segment of each vertical slice and so on, until the last file segments, which represent the last MCU row of the image. Restart markers are added at the end of every MCU row of every vertical slice, before a new MCU row is started, to guarantee file-segment independent handling of the DC component and easy concatenation of the different compressed file segments. FIG. 4 depicts a system with 4 parallel devices as shown in FIG. 3.

Three mechanisms are added to the device, to enable it to build the correct partial compressed file segments, which are required for the device parallelism:

1) Coded Data Format. Two bits, which determine the format of the compressed file segments. There are three formats, one for the left vertical slice, one for the right vertical slice and one for all other vertical slices.

Left vertical slice of the image. The device puts the SOI (start of image) marker, the table specific or miscellaneous markers and the SOF (start of frame) marker segment, as in the standard JPEG file. In the beginning of each scan, more optional marker segments can be inserted and then the SOS (start of scan) marker segment is added. The Defined Restart interval (DRI) marker must be added with the correct RI (restart interval), to guarantee proper operation. The number of MCU's per MCU row must be an integer multiple of RI. For implementation simplicity, RI should equal the number of MCUs in an MCU row in each slice. The correct Restart counts, which depend on the number of parallel devices and the vertical slice number ("0" for the most left one), are inserted in the right places, including an RST at the end of the scan (end of last MCU row). The increment of the RST count starting with "0" for the first MCU row, is done with the number of parallel devices. No DNL (define number of lines) or EOI (end of image) markers are saved at the end of the last compressed file segment.

"Middle" vertical slices of the image. The device does not put the SOI marker, the optional marker segments and the SOF and SOS marker segments in the beginning of the first file segment. The restart mechanism must be enabled based on the DRI marker, although the marker segment itself is not added to the first compressed file segment. The correct Restart counts, which depend on the number of parallel devices and the vertical slice number ("1" for the left most middle vertical slice and "N-2" for the right most middle vertical slice), are inserted in the right places, including a RST at the end of the scan (end of last MCU row). The increment of the RST count, starting with "1" for the left slice and N−2 for the right slice, is done with the number of parallel devices. No DNL (define number of liens) or EOI (end of image) markers are saved at the end of the last compressed file segments.

Right vertical slice of the image. This device does not put the SOI marker, the optional marker segments and the SOF and the SOS marker segments in the beginning of the first file segment. The restart mechanism must be enabled based on the DRI marker, although the mark itself is not added to the first compressed file segment. The correct Restart counts, which depend on the number of parallel devices and the vertical slice number ("N−1" for the most right one), are inserted in the right places, without an RST at the end of the scan (end of last MCU row). The increment of the RST count starting with "N-1" for the first MCU row, is done with the number of parallel devices. DNL (define number of lines), if required, and EOI (end of image) markers are saved at the end of the last compressed file segment.

2) The device number (the device number is the vertical slice number) and the number of parallel devices in the system must be programmed to the devices for correct implanting of the Restart mechanism. The RST number is calculated by adding the number of devices, instead of one, at the end of every MCU row. The initial RST number is the device number starting from zero for the most left one and N−1 for the most right one.

3) A flush mechanism is added to guarantee proper concatenation of the various compressed file segments. At the end of every MCU row, the device must empty its internal code buffer, before it can start to encode the next MCU row. After all of the internal buffer is emptied, the device notifies the system, and only after all devices have completed to empty their buffers, compression of the next MCU row in every vertical slice can start. An improvement to the above is a dual code buffer, where after the flush, the coding continues to the second buffer, while the first buffer is emptied, so the two MCU rows are separated from each other.

The multi-chip system can decode any JPEG compatible file, including those which are generated by other systems. The special Restart markers, which are required for the encoding process, are not required for the decoding process.

The compressed file has less data than the original file since most of the DCT coefficients after compression become zero and the total number of bits in the compressed file is small. Most of the decompression process (Huffman decoding, DC coefficient generation and dequantization), except for the IDCT, is proportional to the number of non zero quantized coefficients, each device can actually decode all the compressed file, except for the IDCT part, which is proportional to the number of pixels and not the number of non zero coefficients.

Each device reads the whole compressed file, Huffman decodes it and generates the correct quantized DC coefficients out of the differential ones. This process is proportional in computation effort to the number of non zero quantized coefficients. The next step is to assign the various blocks to the different devices, with each block assigned to a specific device, as will be described later. Each device dequantizes the coefficient blocks, which are assigned to it and executes the inverse DCT transform on these blocks, generating the image pixels.

Figure 5:
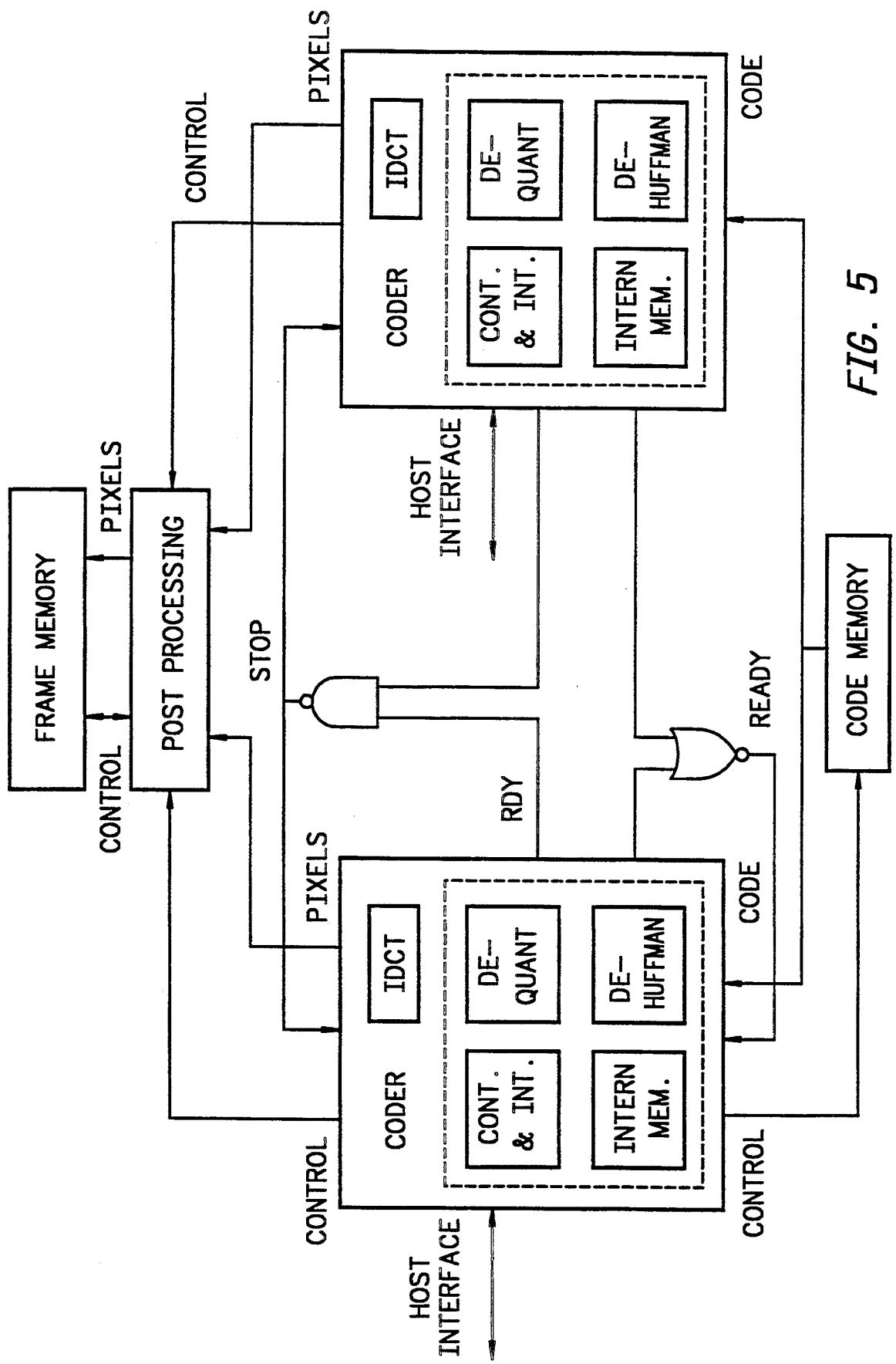
FIG. 5 is a functional block diagram of two devices operating in parallel for the decompression of encoded data in accordance with another embodiment of the invention.

Only the Huffman decoding and the DC extraction out of the differential ones, must be performed on all blocks. The rest of the process is performed in each device, only on the blocks, which are assigned to this device. The fact that part of the process must be done on the whole compressed file, is the limiting factor on the amount of parallelism, which can be achieved in decoding. The parallelism can therefore be achieved since most of the quantized coefficients are zero. FIG. 5 depicts a system with 2 parallel devices.

The maximum number of units that can be connected in parallel is given by the ratio between the computation time required to do the IDCT and the time required for Huffman and DC decoding plus quantization. As explained, this is approximated by the ratio between the number of pixels and the number of non zero quantized coefficients. This ratio can be improved further by increasing the speed of Huffman decoding in each unit.

Four mechanisms are added to a standard decoder to enable it to decode the compressed file correctly by more than one device:

1) Block distribution processing. This feature controls the distribution of the Huffman decoded blocks, after the quantized DC extraction, to the different devices. In order to support it, three registers are added:

Space-0— This register defines how many blocks the device will skip when it starts to decode the coded data or after it skipped Space-1 blocks. The skipped blocks will go through the internal process of Huffman decoding, DC coefficient extraction and optional dequantization without the IDCT process.

Width — This register defines how many blocks the device will run through the whole process including the dequantization and IDCT after it skipped Space-0 blocks.

Space-1— This register defines how many blocks the device will skip after it processed Width blocks. The skipped blocks will go through the internal process of Huffman decoding, DC coefficient extraction and optional dequantization without the IDCT process.

The sum of the above three parameters will usually be equal to an MCU, but in certain cases it can be also a fraction or a multiple of an MCU. The sum of them is also equal in all devices and it equals the sum of all Widths from all the devices together.

2) Buffering mechanism. The maximum parallelism, which can be achieved, is the number of image pixels divided by the number of non zero quantized coefficients in the whole compressed file. In this case the maximum device parallelism is increased by the parallelism factor in the Huffman decoding. If we want to achieve continuous flow of pixel blocks, without any buffering, then the maximum parallelism will be the number of image pixels in a block (64) divided by the maximum number of non zero coefficients in a block. Adding buffering of K blocks will allow to parallel up to K*64 divided by the maximum sum of non zero coefficients in K successive blocks, devices. The parallelism can therefore be increased by either adding buffers, allowing some discontinuities in the pixels stream.

3) Compressed file read synchronization. Since all N devices read the same compressed file from the same source, a synchronization mechanism must be provided. This is done using two signals. An output FULL signal, which monitors the internal code buffer and is activated after the buffer is filled up with more than L bytes (L can be programmable and depends on the implementation itself) and an input READY signal which prevents future reads from the compressed file. Only one device controls the compressed file read operations and its READY signal is generated by NORing all the FULL signals. This mechanism allows the system to have one compressed file, which is controlled by one of the parallel devices for all of them.

4) Pixel bus synchronization. When the scan is block interleaved and the system requires all components of the same MCU to appear on the pixel bus together, a synchronization mechanism must be added, since the processing time of each block inside the device can be different. This is done in a similar way to the compressed file read using two signals. An output RDY signal which is set when a full block of pixels is ready and an input STOP signal which prevents sending out the new pixel block. All the RDY signals can be NANDed together to generate the same STOP signal for all the devices. This mechanism prevents outputting the next blocks from all devices as long as they are not ready.

In addition to the above features two additional features are added to the encode process to guarantee efficient operation of the decode process. These features enable the encoder to limit the maximum number of non zero coefficients per block and the maximum number of bits per block. Setting them to specific limits can guarantee efficient parallel operation without slowing down due to blocks with too many non zero coefficients or too many bits. These additions have negligible influence, unless the limits are very small, on the decompressed image quality and in most cases the degradation in image quality will not be noticeable.

The decode process is therefore as follows:

1) The whole compressed file is Huffman decoded, by all parallel devices, generating the non zero quantized coefficients of all blocks.
2) The DC quantized coefficients are generated, by all parallel devices, for all blocks, out of the Diff_DC values. After this step all the blocks are independent of each other and therefore all further processing of a block can be done independently.
3) The various blocks are assigned to specific devices, each block to one device, for further processing.
4) Dequantization of all non zero quantized coefficients in the block, by the device which the specific block is assigned to. This step is still proportional to the number of non zero quantized coefficients in the block and not to the number of pixels, but since all blocks are independent, there is no need for parallel process of all blocks any more.
5) IDCT of every block, by the device which the specific block is assigned to.
6) The system combines the blocks together with rasterization to one stream of pixels of the image.

Figure 6:
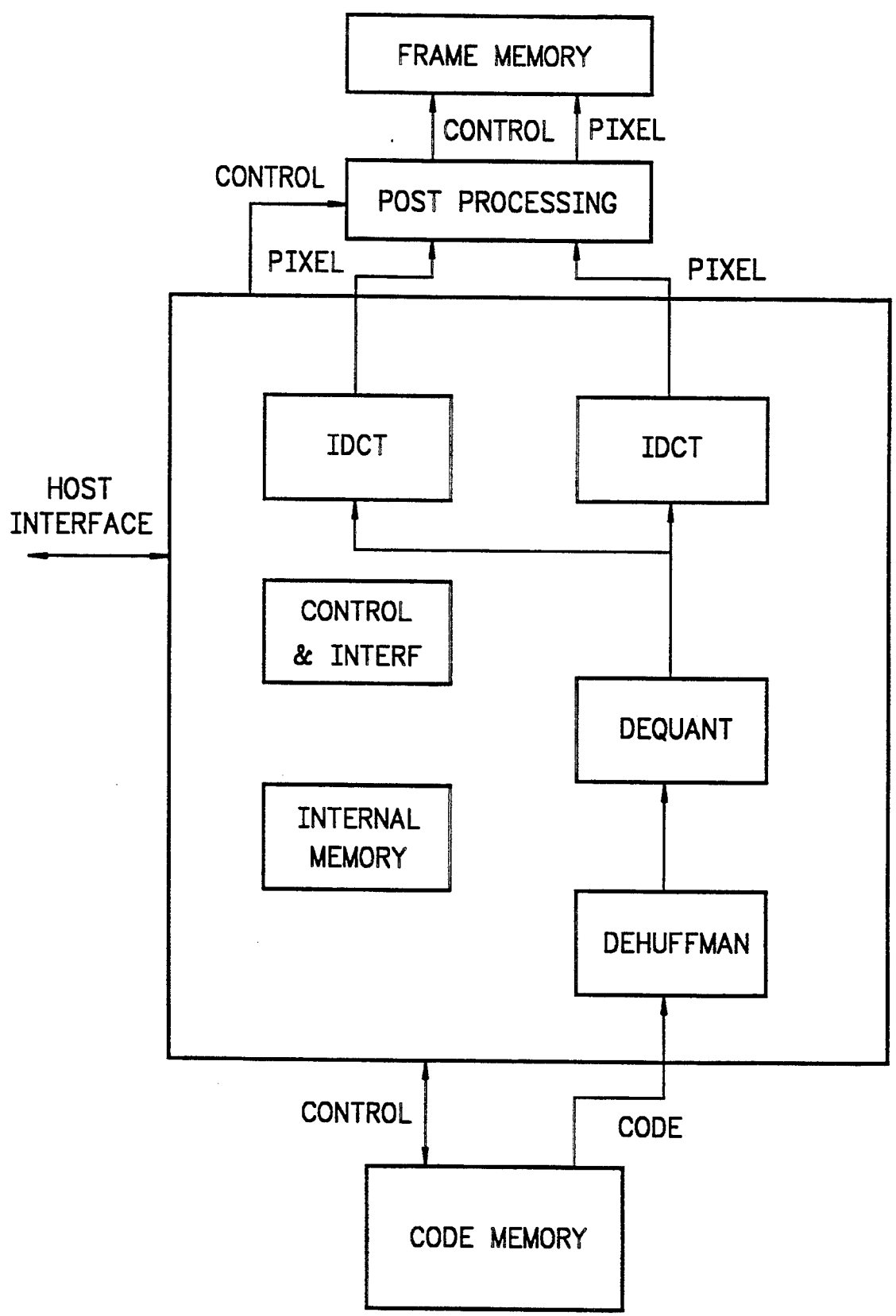
FIG. 6 is a functional block diagram of a decoder device having two IDCT function units operating in parallel in accordance with the invention.

Increased decoding speed can be realized based on the same assumptions as the parallel decoding option with some differences in the implementation phase. FIG. 6 is a block diagram of a device with double decoding speed improvement. The main difference and advantage is that in this option there is no need to parallel devices and the increase in decoding speed is achieved using one device only. This means that there is no need for the Space and Width parameters and the synchronization mechanisms. There is still the need for buffering exactly as in the previous implementation. The maximum speed increase is hardwired in this solution and has to be defined when the device is designed. The extra hardware, which is required and which is linear to the speed increase, is the number of IDCT engines and output pixel buses. For every 100% increase in decoding speed an extra IDCT engine must be added and an extra pixel bus with internal buffer must be added. This means more internal hardware for the IDCT engine and the internal buffers and more pins for the extra buses. The addition of IDCT's can be solved also by adding external IDCT's over the first one and provide additional coefficient buses instead of pixel buses. Still the extra output buses (coefficient buses in this case) and buffer are required and their number increase with increased decoding speed.

The two decoding schemes shown in the embodiments of FIGS. 5,6 can be combined together with one device implementing N speed improvement by adding N-1 buses and N-1 IDCT's (or external IDCT's) to the basic device which has one DCT and one bus. This device (or devices if some of the extra IDCT's are external) can be paralleled M times for a total of MN speed improvement. Any combination of M and N is possible up to the limit, which is imposed by the number of non zero quantized coefficients.

There has been described multi-device encoding/decoding for DCT based compression/decompression algorithms which provides enhanced speed of operation. While the invention has been described with reference to specific embodiments, the description is illustrative of the invention and is not to be construed as limiting the invention. Various modifications and applications may occur to those skilled in the art without departing from the true spirit and scope of the invention as defined by the appended claims.

What is claimed is:

1. A method of encoding image data for an image frame, using a discrete cosine transform (DCT) compression algorithm comprising the steps of:
   (a) providing a plurality (N) of encoding devices,
   (b) dividing each frame of said image data into a plurality (N) of vertical slices,
   (c) assigning each one of said vertical slices to each respective one of said encoding devices,
   (d) operating said plurality of encoding devices in parallel to concurrently provide encoded slice data, and
   (e) concatenating said encoded slice data to construct encoded data from said image frame.

2. The method as defined by claim 1 wherein said encoded slice data comprise partial compressed file segments, each of said segments including code identifying left, middle, and right vertical slices.

3. The method as defined by claim 2 wherein a left vertical slice coded data format includes a start of image marker, a start of frame marker, a start of scan marker, Defined Restart Interval (DRI) marker segment, tables specific and miscellaneous marker segments and restart markers, a middle vertical slice coded data format includes a restart number, and a right vertical slice coded data format includes restart markers and end of image marker.

4. The method as defined by claim 3 wherein said image data is arranged in rows in said vertical slices with each row including a plurality of minimum code units, all of said encoding devices operating on assigned slices in the same row.

5. The method as defined by claim 4 wherein each of said encoding devices provides an encoded slice segment for each row, said encoded slice segment for each row being concatenated for transmission and for storage.

6. The method as defined by claim 1 wherein said image data is arranged in rows in said vertical slices with each row including a plurality of minimum code units, all of said encoding devices operating on assigned slices in the same row.

7. The method as defined by claim 6 wherein each of said encoding devices provides an encoded slice segment for each row, said encoded slice segment for each row being combined for transmission and for storage.

8. A method of decoding a frame of encoded image data to obtain a frame of pixel data using an inverse discrete cosine transform (IDCT) decompression algorithm comprising:
   (a) providing a plurality (N) of decoding devices,
   (b) each of said decoding devices receiving and Huffman decoding all said encoded image data in a frame and generating quantized DC coefficients for blocks of said encoded image data in said frame,
   (c) concurrently decoding said quantized DC coefficients of all blocks of data in said each of said decoding devices including executing the IDCT decompression algorithm on each block in an assigned decoding device thereby generating image pixel data, and
   (d) combining said image pixel data for said all blocks to provide a frame of pixel data.

9. The method as defined by claim 8 and further including synchronizing reading of compressed data by said decoding devices including generating a full signal when an internal code buffer in one of said decoding devices is filled, and generating an output ready signal by performing a NOR function on full signals from all said decoding devices, read operations from said compressed data being prevented by said ready signal.

10. The method as defined by claim 9 and further including pixel bus synchronization including generating an output ready signal in each of said decoding devices when a full block of decoded pixels is ready, and generating an input stop signal by performing a NAND function on all output ready signals, said input stop signal preventing sending out a decoded pixel block.

11. The method as defined by claim 8 and further including pixel bus synchronization including generating an output ready signal in each of said decoding devices when a full block of decoded pixels is ready, and generating an input stop signal by performing a NAND function on all output ready signals, said input stop signal preventing sending out a decoded pixel block.

12. Apparatus for encoding image data for an image frame using a discrete cosine transform (DCT) compression algorithm comprising:
   a plurality (N) of encoding devices,
   means for dividing each frame of image data into a plurality (N) of vertical slices of image data, each of said slices being assigned to one of said encoding devices for concurrently encoding of one of said slices of image data and the encoding of other slices of image data, and
   means for concatenating the encoded slices of image data to construct encoded image data for said image frame.

* * * * *